(12) United States Patent
Sabraoui (10) Patent No.: US 11,733,078 B2
(45) Date of Patent: Aug. 22, 2023

(54) PIEZOELECTRIC CELL SUPPORT FOR AN ULTRASONIC TRANSDUCER

(71) Applicant: SAGEMCOM ENERGY & TELECOM SAS, Rueil Malmaison (FR)

(72) Inventor: Abbas Sabraoui, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 193 days.

(21) Appl. No.: 17/072,894

(22) Filed: Oct. 16, 2020

(65) Prior Publication Data

US 2021/0116275 A1 Apr. 22, 2021

(30) Foreign Application Priority Data

Oct. 17, 2019 (FR) ........................... 1911651

(51) Int. Cl.
*G01F 1/66* (2022.01)
*G01F 15/14* (2006.01)
*G10K 11/00* (2006.01)

(52) U.S. Cl.
CPC ............... *G01F 1/66* (2013.01); *G01F 1/662* (2013.01); *G01F 15/14* (2013.01); *G10K 11/004* (2013.01); *G10K 11/006* (2013.01); *G01N 2291/02836* (2013.01)

(58) Field of Classification Search
None
See application file for complete search history.

(56) References Cited

U.S. PATENT DOCUMENTS

| 2011/0239780 | A1 | 10/2011 | Berger et al. | |
|---|---|---|---|---|
| 2013/0269448 | A1* | 10/2013 | Berger | G01F 1/662 73/861.27 |
| 2016/0103005 | A1* | 4/2016 | Wiest | G01F 1/662 73/861.27 |
| 2017/0307425 | A1* | 10/2017 | Berberig | G01F 1/662 |
| 2019/0033106 | A1* | 1/2019 | Ramond | G01F 1/662 |
| 2021/0006875 | A1* | 1/2021 | Sabraoui | G01F 1/662 |

FOREIGN PATENT DOCUMENTS

| CN | 204694317 U | 10/2015 |
|---|---|---|
| CN | 206469925 U | 9/2017 |
| DE | 2934031 B1 | 10/1980 |
| EP | 1366341 A1 | 12/2003 |
| WO | WO 94/04890 A1 | 3/1994 |

\* cited by examiner

*Primary Examiner* — Harshad R Patel
(74) *Attorney, Agent, or Firm* — Muncy, Geissler, Olds & Lowe, P.C.

(57) ABSTRACT

A piezoelectric cell support for an ultrasonic transducer, the support including a front face having formed thereon: a first shoulder that defines a bearing surface and a bottom of a central cavity surrounded by the bearing surface, the bearing surface being suitable for having a piezoelectric cell placed thereon; retention device(s) for holding the piezoelectric cell on the bearing surface and for positioning it angularly; and a rear face having a sloping surface that gives a top portion of the support a first thickness that is less than a second thickness of a bottom portion of the support.

16 Claims, 6 Drawing Sheets

PIEZOELECTRIC CELL SUPPORT FOR AN ULTRASONIC TRANSDUCER

The invention relates to the field of ultrasonic transducers, and in particular to ultrasonic transducers included in ultrasonic fluid meters.

BACKGROUND OF THE INVENTION

When designing a fluid meter, it is naturally ensured that the performance of the metrological portion of the fluid meter, as obtained when the fluid meter is in operation "in the field", is similar to the performance as obtained when the fluid meter is calibrated on a test bench in the factory.

It is therefore necessary to take account of numerous factors that might disturb measurement, and possibly even falsify it completely. These factors include in particular the conditions surrounding the fluid meter in operation, and in particular the temperature and the pressure of the fluid applied to the metrological portion.

For an ultrasonic fluid meter including ultrasonic transducers, each provided with a respective piezoelectric cell, mastering assembly of the piezoelectric cell is fundamental for ensuring robustness for the metrological portion.

Figure 1:
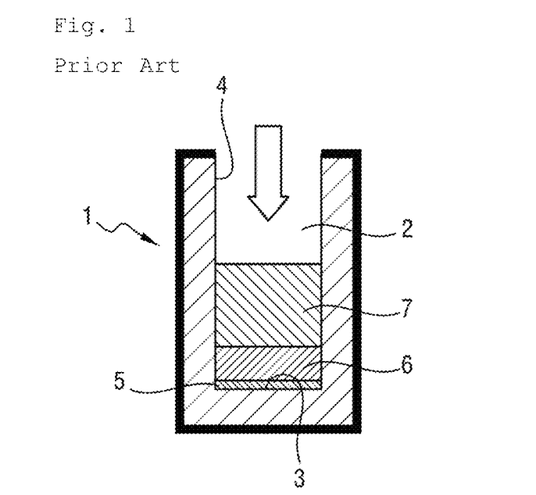
FIG. 1 shows an ultrasonic transducer assembled as a horizontal assembly.

With reference to FIG. 1, a conventional ultrasonic transducer 1 of a fluid meter is assembled by so-called "horizontal" assembly. The ultrasonic transducer 1 includes a housing 2 having a bottom 3 and a vertical inner wall 4 that extends perpendicularly from the bottom 3. Assembly consists in applying adhesive 5 to the bottom 3 of the housing 2, in pressing the front face of the piezoelectric cell 6 against the bottom 3 of the housing 2, and while the adhesive is setting in applying a vertical force on the support 7 (or "backing") of the piezoelectric cell 6 in order to fasten the piezoelectric cell 6 against the bottom 3 of the housing 2.

Horizontal assembly is nowadays well mastered.

Figure 2:
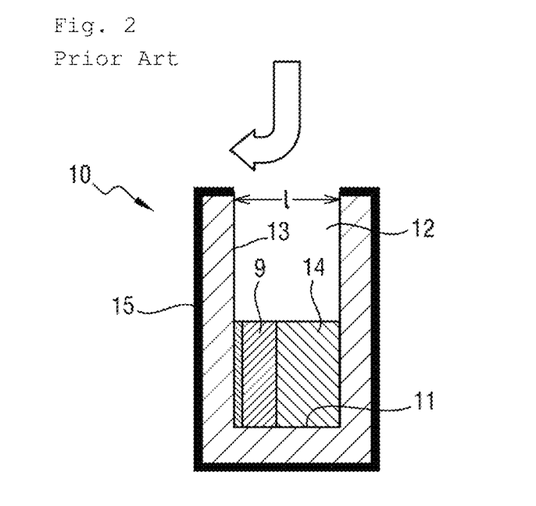
FIG. 2 shows an ultrasonic transducer assembled as a vertical assembly.

With reference to FIG. 2, it has nevertheless been envisaged that the front face of the piezoelectric cell 9 of an ultrasonic transducer 10 should be pressed, not against the bottom 11 of the housing 12, but rather against a surface of the vertical inner wall 13 of the housing 12. This is referred to as "vertical" assembly. It is then very difficult to apply a horizontal force against the support 14 while the adhesive is setting, particularly since the width l of the housing 12 may be very small (typically equal to 1 centimeter (cm)).

The quality of the coupling between the piezoelectric cell 9 and the vertical inner wall 13 is of great importance in such vertical assembly. Specifically, the pressure of the water acting against the vertical outer wall 15 tends to cause the piezoelectric cell 9 to become unstuck from the vertical inner wall 13. Degraded coupling leads to a loss of signal level, or even to total loss of signal in the event of the piezoelectric cell 9 becoming completely unstuck from the vertical inner wall 13.

Naturally, coupling optimization must not be done to the detriment of measurement accuracy. In order to guarantee measurement performance that is stable as a function of temperature, it is known that it is necessary to take care in selecting all of the materials of all of the elements making up the ultrasonic transducer 10, and in particular the material(s) used for making the support 14. The acoustic impedance of the support 14 must be as stable as possible as a function of temperature. The optimum material for providing this stability of acoustic impedance is air because, given the large impedance difference between the piezoelectric cell 9 and air, the amount of energy that is transmitted into air is almost zero, regardless of whether the temperature is equal to 5° C. or to 70° C. All of the energy produced by the piezoelectric cell 9 is thus transmitted into the water. Nevertheless, a support made only of air would not guarantee stable measurement performance as a function of the pressure of the fluid acting against the vertical outer wall 15 of the housing 12 of the ultrasonic transducer 10.

Furthermore, it is appropriate to ensure that the elements making up the ultrasonic transducer can be assembled in a manner that is repeatable in order to guarantee good reproducibility of measurement performance between different transducers.

Figure 3:
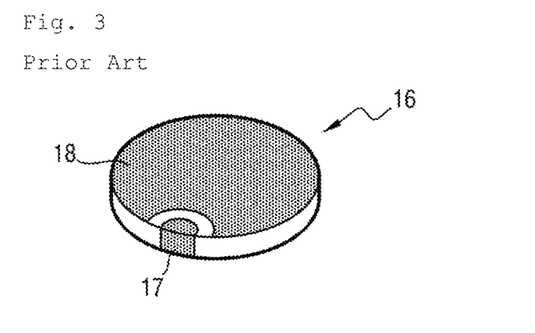
FIG. 3 shows a piezoelectric cell having wraparound type electrodes.

With reference to FIG. 3, this problem is particularly acute when the piezoelectric cell 16 has a first electrode 17 and a second electrode 18 of the wraparound type. A first electric wire is connected to the first electrode 17 and a second electric wire is connected to the second electrode 18. The shape of the acoustic field depends on the position of the connection, which must therefore be well-controlled and repeatable.

Figure 4:
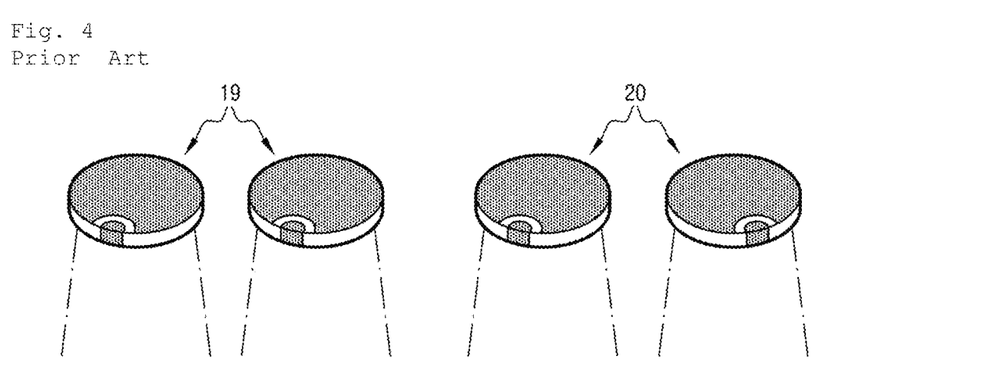
FIG. 4 shows the piezoelectric cells of two fluid meters.

FIG. 4 shows the angular positions of the piezoelectric cells 19 of the two ultrasonic transducers of a first meter, and the angular positions of the piezoelectric cells 20 of the two ultrasonic transducers of a second meter. It can be seen that, when the angular positions are different, the acoustic fields are different and there is potential for measurement performance also to be different.

OBJECT OF THE INVENTION

An object of the invention is to provide a piezoelectric cell support that serves to make assembly of a piezoelectric cell in an ultrasonic transducer easy and repeatable, in particular for vertical assembly, and that serves to take measurements that are stable as a function of the temperature and the pressure that are applied by the fluid.

SUMMARY OF THE INVENTION

In order to achieve this object, there is provided a piezoelectric cell support for an ultrasonic transducer, the support including a front face having formed thereon:
  a first shoulder that defines a bearing surface and a bottom of a central cavity surrounded by the bearing surface, the bearing surface being suitable for having a piezoelectric cell placed thereon;
  retention means and angular positioning means for holding the piezoelectric cell on the bearing surface and for positioning it angularly;
  and a rear face having a sloping surface that gives a top portion of the support a first thickness that is less than a second thickness of a bottom portion of the support.

When the piezoelectric cell is mounted on the support and held in position by the retention means, the edge of the piezoelectric cell is positioned against the bearing surface, and the central cavity, which is full of air, is closed by a central portion of the piezoelectric cell. The measurements taken by an ultrasonic transducer including the piezoelectric cell and its support are thus stable as a function both of temperature and of pressure. The means for angularly positioning the piezoelectric cell on the bearing surface ensure that the connections are in the same positions in each assembly of a support and a piezoelectric cell, thereby making such assembly entirely repeatable.

The sloping surface and the difference in thickness between the top and bottom portions of the support greatly facilitate vertical assembly of the piezoelectric cell, in particular in a housing of small width.

There is also provided a support as described above, wherein the angular positioning means include a passage for electric wires that are connected to the electrodes of the piezoelectric cell.

There is also provided a support as described above, wherein the passage includes a hole passing through a top outer side wall of the top portion of the support.

There is also provided a support as described above, wherein the bottom portion of the support includes a bottom face of the support that is for placing on a bottom of a housing of a casing of an ultrasonic transducer.

There is also provided a support as described above, wherein the bearing surface and the front outer surface of the front face of the support form a second shoulder on the front face of the support, the retention means comprising at least one projection formed on an inner wall of the support that extends between the front outer surface and the bearing surface.

There is also provided a support as described above, wherein the bearing surface is arranged to receive a piezoelectric cell of section that is circular.

There is also provided a support as described above, wherein the bearing surface is arranged to receive a piezoelectric cell of section that is square or rectangular.

There is also provided a support as described above, the support being made of a plastics material.

There is also provided a support as described above, the support being made of a metal material.

There is also provided an assembly comprising a piezoelectric cell and a support as described above, the piezoelectric cell being mounted on the bearing surface and closing the central cavity, which is full of air.

There is also provided an ultrasonic transducer comprising a casing defining a housing, a piezoelectric cell, and a support as described above, the piezoelectric cell being mounted on the support, the piezoelectric cell and the support being positioned in the housing.

There is also provided an ultrasonic transducer as described above, wherein the housing includes a bottom and an inner wall that extends from the bottom of the housing, the piezoelectric cell and the support being arranged in the housing in such a manner that the piezoelectric cell is positioned against the inner wall of the housing.

There is also provided an ultrasonic transducer as described above, wherein the inner wall of the housing slopes at an angle lying in the range 45° to 90° relative to the bottom of the housing.

There is also provided an ultrasonic fluid meter including first and second ultrasonic transducers as described above.

There is also provided an ultrasonic fluid meter as described above, including a duct for passing a flow of fluid, a first housing of the first ultrasonic transducer and a second housing of the second ultrasonic transducer extending into the inside of the duct respectively from first and second regions of an inside wall of the duct, a first piezoelectric cell of the first ultrasonic transducer and a second piezoelectric cell of the second ultrasonic transducer being situated and oriented facing each other and in parallel.

There is also provided an ultrasonic fluid meter as described above, wherein a first longitudinal axis of the first housing and a second longitudinal axis of the second housing slope respectively relative to the first and second regions of the inside wall at an angle lying in the range 45° to 90°.

There is also provided an ultrasonic fluid meter as described above, wherein the first and second ultrasonic transducers are positioned so that a first position of the first ultrasonic transducer presents a first offset on one side of a plane containing a central longitudinal axis of the duct, and in such a manner that a second position of the second ultrasonic transducer presents a second offset on the other side of said plane.

There is also provided a method of assembling an ultrasonic transducer as described above, the method comprising the steps of:

mounting the piezoelectric cell on the bearing surface of the support;

applying an adhesive to a first surface of an inner wall of the housing and/or to a front face of the piezoelectric cell;

inserting the piezoelectric cell and the support in the housing of the transducer, in such a manner that the bottom portion of the support rests on the bottom of the housing and in such a manner that the piezoelectric cell is pressed against the first surface of the inner wall of the housing;

inserting a tool into the housing between the rear face of the support and a second surface of the inner wall of the housing that is situated facing the first surface, in such a manner that the tool slides on the sloping surface of the support from the top portion towards the bottom portion of the support, thereby pressing the piezoelectric cell against the first surface of the inner wall of the housing.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

With reference to FIGS. 5 to 9, a piezoelectric cell support 20 of the invention has a front face 21 and a rear face 22.

Figure 5:
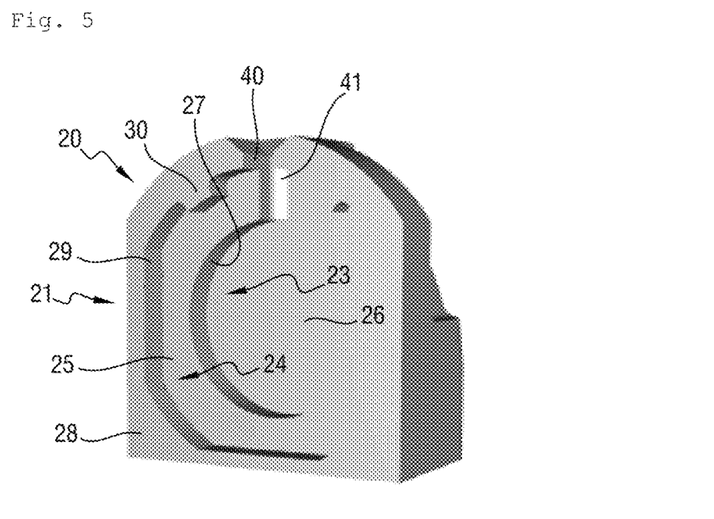
FIG. 5 is a perspective view of a front face of a piezoelectric cell support of the invention.

The front face 21 has a first shoulder 23 and a second shoulder 24.

The first shoulder 23 defines a bearing surface 25, a bottom of a central cavity 26, and a first inner wall 27 that extends perpendicularly from the bottom of the central cavity 26 to the bearing surface 25. The central cavity 26 is defined by the bottom and by the first inner wall 27.

The bearing surface 25 is annular in shape and it surrounds the central cavity 26.

The bearing surface 25, a front outer surface 28, and a second inner wall 29 form the second shoulder 24. The second inner wall 29 extends perpendicularly from the bearing surface 25 to the front outer surface 28. The front outer surface 28 surrounds the bearing surface 25.

The bottom of the central cavity 26, the bearing surface 25, and the front outer surface 28 are mutually parallel surfaces that are centered on a common axis, and they are arranged in succession in this order from the bottom of the central cavity 26 to the outside of the support 20.

The support 20 also has two projections 30, each of length extending radially from the second inner wall 29 on the bearing surface 25. Each projection 30 has the same height as the second inner wall 29 and is of a length that is considerably shorter than the width of the bearing surface 25.

Figure 6:
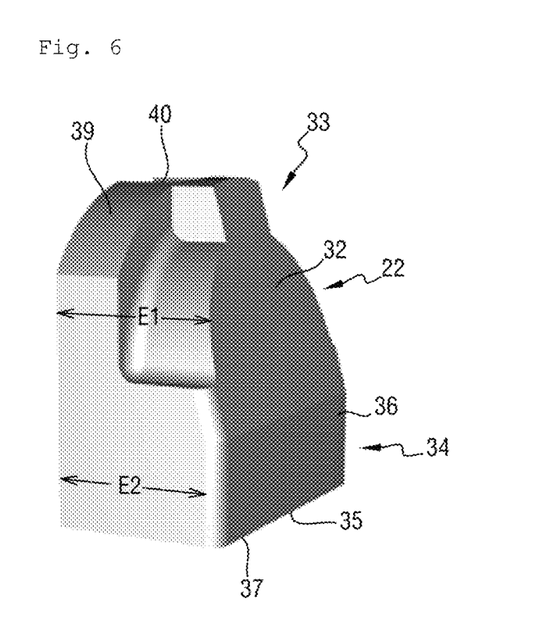
FIG. 6 is a perspective view of a rear face of the support.

The rear face 22 has a sloping surface 32 that gives a top portion 33 of the support 20 a first thickness E1 that is less than a second thickness E2 of a bottom portion 34 of the support 20.

The bottom portion 34 of the support 20 has a bottom face 35 of the support 20, which bottom face is a plane surface.

The bottom portion 34 of the support 20 also has a rear plane face 36 situated on the rear face 22, and that is perpendicular to the bottom face 35. The intersection between the bottom face 35 and the rear plane surface 36 forms a rear bottom edge 37 of the support 20.

The sloping surface 32 of the rear face 22 extends from the rear plane surface 36 to a top outer side wall 39 of the top portion 33 of the support 20. The top outer side wall 39 presents a shape that is rounded towards the outside of the support 20. The top outer side wall 39 is thus situated opposite from the bottom face 35. The slope of the sloping surface 32, i.e. the angle between the sloping surface 32 and the rear plane surface 36, lies in the range 5° to 85°, and advantageously in the range 35° to 55°.

A slot-shaped hole 40 is formed in a central portion of the top outer side wall 39 of the support 20. The hole 40 extends from the bearing surface 25 to the front outer surface 28 (and is thus open to the outside), and it passes through the top outer side wall 39 in order to open into a groove 41 that extends radially in the bearing surface 25 between the two projections 30.

It should be observed that the top portion 33 of the support 20 is hollowed out both in the top outer side wall 39 and also in the central portion where the hole 40 is made. These hollows have the effect of causing the thickness of the material that forms the support 20 to be substantially the same over a large portion of the support 20. This is particularly advantageous during manufacture of the support 20 when the support 20 is made using an injection molding technique.

In this example, the support 20 is made of plastics material, e.g. polyphenylene sulfide (PPS), polyether ether ketone (PEEK), polyphenylene oxide (PPO), or polyamide (PA). The support 20 could also be made out of metal, e.g. out of stainless steel, brass, or bronze.

Figure 7:
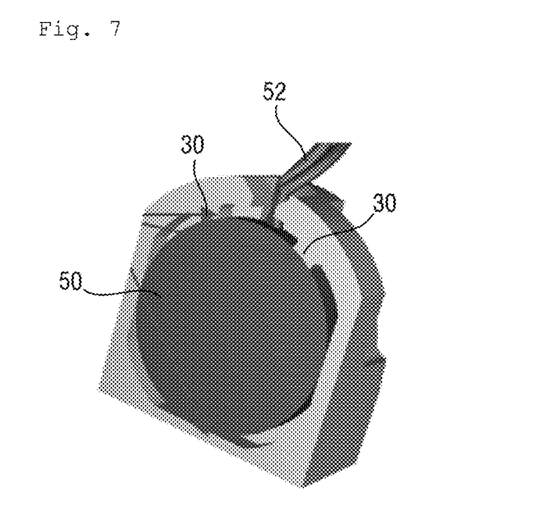
FIG. 7 is a perspective view of a front face of the support having a piezoelectric cell mounted thereon.
Figure 9:
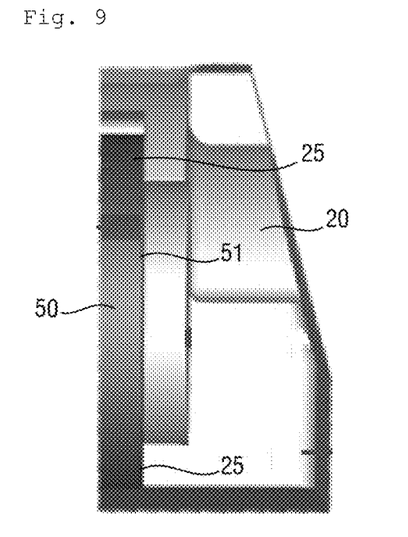
FIG. 9 is a section view of the support and of the piezoelectric cell on a plane perpendicular to the faces of the piezoelectric cell.

A piezoelectric cell 50 is mounted on the bearing surface 25. More precisely, the edges of a rear face 51 of the piezoelectric cell 50 are pressed against the bearing surface 25. The piezoelectric cell 50 is in the shape of a disk: it has a circular section and a thickness that is considerably smaller than its radius. When the piezoelectric cell 50 is mounted on the support 20, the piezoelectric cell 50 and the central cavity 26 are coaxial.

The diameter of the piezoelectric cell 50 is slightly smaller than the outer diameter of the bearing surface 25. The piezoelectric cell 50 has a diameter that lies typically in the range 2 mm to 50 mm.

The support 20 includes retention means for holding the piezoelectric cell 50 against the bearing surface 25. In this example, the retention means comprise the two projections 30. The sum of the diameter of the piezoelectric cell 50 plus the length of the projections 30 is very close to the outer diameter of the bearing surface 25, such that when the piezoelectric cell 50 is mounted on the bearing surface 25, it comes to bear radially against the projections 30, which hold it stationary.

Figure 8:
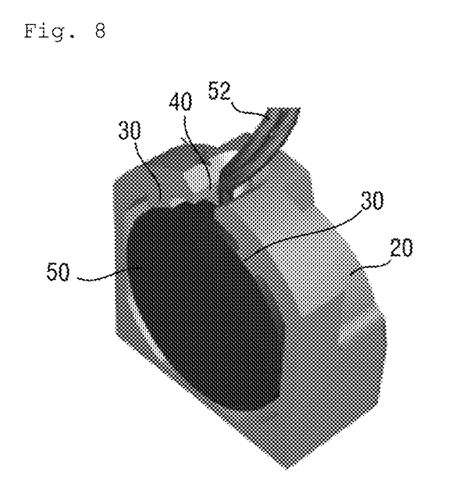
FIG. 8 is a perspective view of a top portion of the support having the piezoelectric cell mounted thereon.

The support 20 also includes angular positioning means for angularly positioning the piezoelectric cell 50 on the bearing surface 25. In this example, the angular positioning means include a passage for electric wires 52 that are connected to the electrodes of the piezoelectric cell 50. The passage includes both the hole 40 passing through the top outer side wall 39 of the top portion 33 of the support 20, and also the groove 41. The angular positioning means also include the electric wires 52 themselves.

Thus, when the piezoelectric cell 50 is mounted on the support 20, the electric wires 52 are inserted in the hole 40 and, because the hole 40 has a width that is small and substantially equal to the diameter of the wires 52, the wires 52 and the hole 40 serve to center the piezoelectric cell 50 and to hold it in a fixed angular position. The orientation of the electric wires 52 and thus the positions of the connections are well controlled, thereby achieving better reproducibility among different products.

When the piezoelectric cell 50 is mounted on the support 20, the edges of the piezoelectric cell 50 are placed on the support surface 25, thereby ensuring very good stability of measurements as a function of water pressure.

Furthermore, when the piezoelectric cell 50 is mounted on the support 20, it closes the central cavity 26, which is full of air.

This central cavity 26 full of air allows the piezoelectric cell 50 to vibrate freely and guarantees that acoustic performance is stable between a low temperature (e.g. equal to 0° C.) and a high temperature (e.g. equal to 70° C.).

It is known that the distribution of the energy produced by the piezoelectric cell 50 complies with a Gaussian distribution, i.e. most of the energy is generated in a central portion of the piezoelectric cell 50. Thus, placing the edges of the piezoelectric cell 50 on the bearing surfaces 25 does not penalize the performance of the piezoelectric cell 50.

Figure 10:
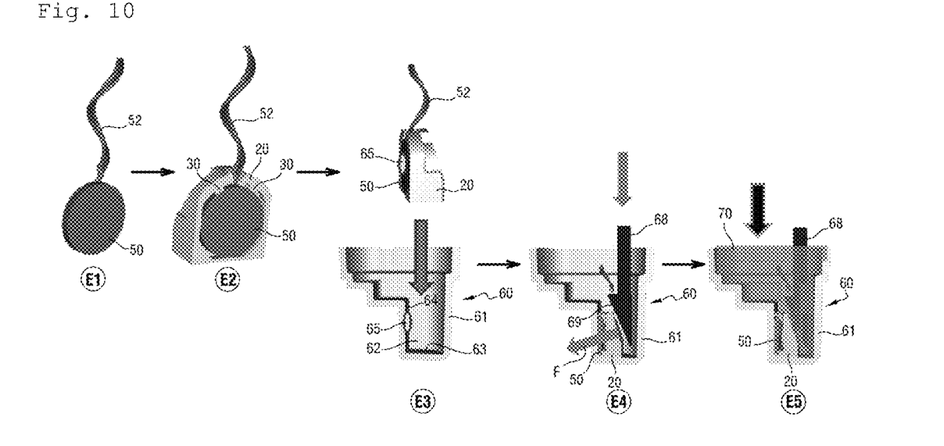
FIG. 10 shows steps of a method of assembling the ultrasonic transducer.

With reference to FIG. 10, there follows a description of a method of assembling the ultrasonic transducer including a support 20 of the invention.

The electric wires 52 are initially connected to the electrodes of the piezoelectric cell 50, e.g. by soldering, (step E1). Thereafter, the piezoelectric cell 50 is mounted on the support 20, with the electric wires 52 being inserted in the hole 40 (step E2).

The ultrasonic transducer 60 includes a casing 61 having a longitudinal housing 62.

The housing 62 has a bottom 63 and a vertical inner wall 64 that extends from the bottom 63 of the housing 62, perpendicularly to the bottom 63. A drop of adhesive 65 is applied on a first surface of the vertical inner wall 64 of the housing 62 (and/or on the front face of the piezoelectric cell 50). The piezoelectric cell 50 and the support 20 are then inserted in the housing 62 in such a manner that the bottom face 35 of the bottom portion 34 of the support 20 rests on the bottom 63 of the housing 62, and in such a manner that the front face of the piezoelectric cell 50 is pressed against the vertical inner wall 64 of the housing 62 (step E3).

Thereafter, a tool 68 is inserted in the housing 62 between the rear face 22 of the support and a second surface of the vertical inner wall 64 of the housing 62, which surface is situated facing the first surface, the tool being inserted in such a manner that it slides over the sloping surface 32 from the top portion 33 of the support 20 towards the bottom portion 34. Insertion of the tool 68 is thus made possible by the difference in thickness between the top portion 33 and the bottom portion 34, which difference is due to the sloping surface 32.

The tool 68 thus presses the piezoelectric cell 50 against the first surface of the vertical inner wall 64 of the housing 62, generating a force F perpendicular to the sloping surface 32 of the rear face 22 of the support 20 (step E4).

Advantageously, the tool has its own sloping surface 69 sloping at an angle equal to or close to the angle of slope of the sloping surface 32 of the support 20.

Thereafter, the casing 61 of the ultrasonic transducer 60 is filled with resin 70. The tool 68 used for inserting and adhesively bonding the support 20 may optionally remain in place inside the casing 61 of the ultrasonic transducer 60 during (and thus after) the application of resin (step E5).

It is possible to add grooves in the surface of the vertical inner wall 64 of the housing 62 of the ultrasonic transducer 60 in order to improve adhesion of the resin on this inner wall, which wall is generally made of plastics material. This serves to improve sealing of the ultrasonic transducer 60 and its ability to withstand water pressure.

It is also possible to include holes in the tool 68 that is used for inserting and adhesively bonding the support, for the purpose of improving adhesion of the resin. This serves to reinforce the portion situated at the rear of the piezoelectric cell of the ultrasonic transducer, thereby improving its impact resistance and its ability to withstand water pressure.

Figure 11:
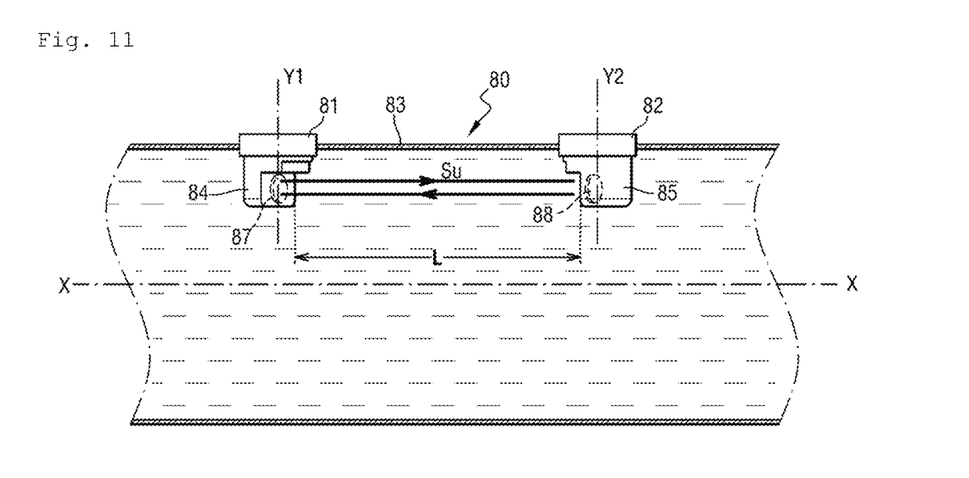
FIG. 11 is a diagrammatic section view on a vertical plane showing a duct and two ultrasonic transducers of a water meter.
Figure 12:
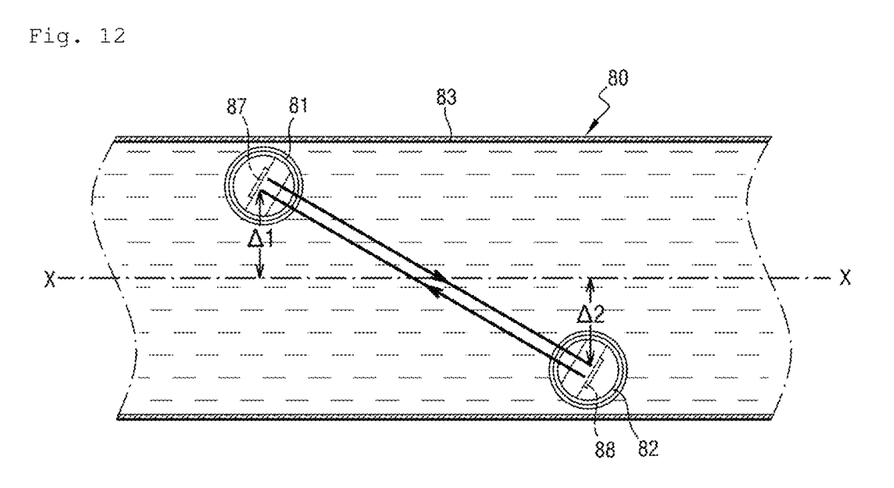
FIG. 12 is a view similar to FIG. 11, but seen from above.

With reference to FIGS. 11 and 12, there follows a description of the way in which first and second ultrasonic transducers 81 and 82 are incorporated in the ultrasonic water meter 80.

The first and second ultrasonic transducers 81 and 82 act in succession as emitters and as receivers of ultrasound measurement signals Su that travel along a path of defined length L in the duct 83. The speed of the water flowing in the duct 83 of the ultrasonic water meter 80 is estimated on the basis of these ultrasound measurement signals Su.

The first and second ultrasonic transducers 81 and 82 are both mounted to project into the duct from an inside wall of the duct 83.

In FIG. 11, it can be seen that the first and second ultrasonic transducers 81 and 82 both extend from respective first and second regions of a top portion of the inside wall of the duct 83, but other configurations would be possible. By way of example, the first ultrasonic transducer 81 could extend from a first region of the top portion of the inside wall of the duct 83, and the second ultrasonic transducer could extend from a second region of the bottom portion of the inside wall of the duct 83.

The first housing 84 of the first ultrasonic transducer 81 and the second housing 85 of the second ultrasonic transducer 82 thus both extend into the inside of the duct 83.

In this example, it can be seen that the first and second housings 84 and 85 are positioned vertically, which explains why it is advantageous for assembly of the piezoelectric cell and the support to be vertical. Thus, a first longitudinal axis Y1 of the first housing 85 and a second longitudinal axis Y2 of the second housing 86 both slope relative to the first or second region respectively of the top portion of the inside wall of the duct 83 at an angle equal to 90°. This angle could be different, and for example it may lie in the range 45° to 90°.

In FIG. 12, it can be seen that the first and second ultrasonic transducers 81 and 82 are not in alignment along a central longitudinal axis X of the duct 83. In contrast, it can be seen that the first and second ultrasonic transducers 81 and 82 are positioned so that a first position of the first ultrasonic transducer 81 presents a first offset Δ1 on one side of a plane containing the central longitudinal axis X of the duct 83, and in such a manner that a second position of the second ultrasonic transducer 82 presents a second offset Δ2 on the other side of the plane. In this example, the plane is a vertical plane, but it could be a plane that is horizontal or sloping at any angle of inclination.

It can be seen in FIG. 12 that the first piezoelectric cell 87 of the first ultrasonic transducer 81 and the second piezoelectric cell 88 of the second ultrasonic transducer 82 are situated so that they are oriented facing each other and in parallel, thereby optimizing the reception of the ultrasound measurement signals Su.

It may be observed at this point that the frequency of a piezoelectric cell advantageously lies in the range 1 megahertz (MHz) to 4 MHz when the fluid is water, and in the range 100 kilohertz (kHz) to 500 kHz when the fluid is a gas. In the above-described application, the fluid is water and the frequency of each of the first and second piezoelectric cells 87 and 88 is equal to 2 MHz.

Naturally, the invention is not limited to the embodiment described, but covers any variant coming within the ambit of the invention as defined by the claims.

It can be seen above that the support of the invention is very advantageous for "vertical" assembly, i.e. when the piezoelectric cell is mounted against an inner wall of a housing, which inner wall is perpendicular to the bottom of said housing. The inner wall might slope relative to the bottom of the housing at a different angle, e.g. lying in the range 45° to 90°.

The piezoelectric cell is not necessarily circular in section and it could have some other section, e.g. square or rectangular.

The retention means and the angular positioning means could be different from those described above. It is entirely possible to have common means serving both to hold the piezoelectric cell and also to position it angularly.

The fluid meter incorporating the ultrasonic transducers naturally need not necessarily be a water meter, but could be a meter for a different fluid, e.g. a gas meter or an oil meter.

The materials used for making the support could naturally be different from the materials mentioned.

In the water meter described, the path of defined length L is a straight line path. Nevertheless, it is possible to use any type of path that is of defined length, possibly including one or more reflectors, mirrors, etc.

The invention claimed is:

1. A piezoelectric cell support for an ultrasonic transducer, the support comprising:
   a front face having formed thereon:
      a first shoulder that defines a bearing surface and forms a first inner wall and a bottom of a central cavity surrounded by the bearing surface, said bearing surface being arranged to support the edges of a rear surface of a piezoelectric cell;

retention means for holding the piezoelectric cell on the bearing surface; and a hole formed through said first shoulder and arranged to provide a passage for electric wires of the piezoelectric cell; and a rear face having a plane and sloping surface inclined relative to the front face, that gives a first portion situated at a first end of the support a first thickness between the front face and the rear face that is less than a second thickness between the front face and the rear face of a second portion situated at a second end of the support opposite to the first end.

2. The support according to claim 1, wherein the second portion of the support includes a bottom face of the support that is for placing on a bottom of a housing of a casing of the ultrasonic transducer.

3. The support according to claim 1, wherein the retention means comprises at least one projection formed on an inner wall of the support that extends between a front outer surface of the front face of the support and the bearing surface.

4. The support according to claim 1, wherein a section of the piezoelectric cell is circular.

5. The support according to claim 1, wherein a section of the piezoelectric cell is square or rectangular.

6. The support according to claim 1, wherein the support is made of a plastics material.

7. The support according to claim 1, wherein the support is made of a metal material.

8. An assembly comprising:
a piezoelectric cell; and
a support, comprising:
a front face having formed thereon:
a first shoulder that defines a bearing surface and forms a first inner wall and a bottom of a central cavity surrounded by the bearing surface, said bearing surface being arranged to support the edges of a rear surface of a piezoelectric cell;
retention means for holding the piezoelectric cell on the bearing surface; and
a hole formed through said first shoulder and arranged to provide a passage for electric wires of the piezoelectric cell; and
a rear face having a plane and sloping surface inclined relative to the front face, that gives a first portion situated at a first end of the support a first thickness between the front face and the rear face that is less than a second thickness between the front face and the rear face of a second portion situated at a second end of the support opposite to the first end,
wherein the piezoelectric cell is mounted on the bearing surface and closing the central cavity, which is full of air.

9. An ultrasonic transducer comprising:
a casing defining a housing;
a piezoelectric cell; and
a support, comprising:
a front face having formed thereon:
a first shoulder that defines a bearing surface and forms a first inner wall and a bottom of a central cavity surrounded by the bearing surface, said bearing surface being arranged to support the edges of a rear surface of a piezoelectric cell;
retention means for holding the piezoelectric cell on the bearing surface; and
a hole formed through said first shoulder and arranged to provide a passage for electric wires of the piezoelectric cell; and a rear face having a plane and sloping surface inclined relative to the front face, that gives a first portion situated at a first end of the support a first thickness between the front face and the rear face that is less than a second thickness between the front face and the rear face of a second portion situated at a second end of the support opposite to the first end,
wherein the piezoelectric cell is mounted on the support, and
wherein the piezoelectric cell and the support are positioned in the housing.

10. The ultrasonic transducer according to claim 9, wherein the housing includes a bottom and an inner wall that extends from the bottom of the housing, the piezoelectric cell and the support being arranged in the housing in such a manner that the piezoelectric cell is positioned against the inner wall of the housing.

11. The ultrasonic transducer according to claim 10, wherein the inner wall of the housing slopes at an angle lying in the range 45° to 90° relative to the bottom of the housing.

12. An ultrasonic fluid meter comprising two ultrasonic transducers according to claim 9.

13. The ultrasonic fluid meter according to claim 12, wherein the two ultrasonic transducers comprise a first ultrasonic transducer and a second ultrasonic transducer, the ultrasonic fluid meter further comprising a duct for passing a flow of fluid, a first housing of the first ultrasonic transducer and a second housing of the second ultrasonic transducer extending into the inside of the duct respectively from first and second regions of an inside wall of the duct, a first piezoelectric cell of the first ultrasonic transducer and a second piezoelectric cell of the second ultrasonic transducer being situated and oriented facing each other and in parallel.

14. The ultrasonic fluid meter according to claim 13, wherein a first longitudinal axis of the first housing and a second longitudinal axis of the second housing slope respectively relative to the first and second regions of the inside wall at an angle lying in the range 45° to 90°.

15. The ultrasonic fluid meter according to claim 14, wherein the first and second ultrasonic transducers are positioned so that a first position of the first ultrasonic transducer presents a first offset on one side of a plane containing a central longitudinal axis of the duct, and in such a manner that a second position of the second ultrasonic transducer presents a second offset on the other side of said plane.

16. A method of assembling the ultrasonic transducer according to claim 9, the method comprising the steps of:
mounting the piezoelectric cell on the bearing surface of the support;
applying an adhesive to a first surface of an inner wall of the housing and/or to a front face of the piezoelectric cell;
inserting the piezoelectric cell and the support in the housing of the transducer, in such a manner that the second portion of the support rests on a bottom of the housing and in such a manner that the piezoelectric cell is pressed against a first surface of the inner wall of the housing;
inserting a tool into the housing between the rear face of the support and a second surface of the inner wall of the housing that is situated facing the first surface, in such a manner that the tool slides on the sloping surface of the support from the first portion towards the second portion of the support, thereby pressing the piezoelectric cell against the first surface of the inner wall of the housing.

* * * * *